United States Patent [19]
Loker et al.

[11] Patent Number: 5,385,161
[45] Date of Patent: Jan. 31, 1995

[54] UMBRELLA SUPPORT

[76] Inventors: Keith G. Loker, P.O. Box 26, Chaptico, Md. 20621; James B. Bland, III, 640 Willow Rd., Lusby, Md. 20657

[21] Appl. No.: 242,883

[22] Filed: May 16, 1994

[51] Int. Cl.⁶ .............................................. A45B 11/00
[52] U.S. Cl. ................................... 135/15.1; 135/25.4; 248/514; 248/537; 248/205.5; 248/206.5
[58] Field of Search ............... 248/514, 518, 534, 537, 248/205.5, 206.3, 206.4, 291, 293, 314; 135/25.4, 15.1; 294/142, 167, 169

[56] References Cited

U.S. PATENT DOCUMENTS

| | | | |
|---|---|---|---|
| 1,523,042 | 1/1925 | Thomas | 248/537 |
| 2,055,842 | 9/1936 | Haislip | 248/534 X |
| 2,576,624 | 11/1951 | Miller | 248/514 |
| 3,191,898 | 6/1965 | McCullough | 248/514 |
| 3,759,278 | 9/1973 | Hoffmann | 135/25.4 X |
| 4,188,965 | 2/1980 | Morman | 135/15.1 X |
| 4,570,894 | 2/1986 | Miele | 248/534 |
| 4,624,276 | 11/1986 | Allen | 135/25.4 |
| 4,632,137 | 12/1986 | Exley et al. | 135/25.4 X |
| 4,696,447 | 9/1987 | Strecker | 248/314 X |
| 4,856,546 | 8/1989 | Kummunsalo | 135/20 R |
| 5,150,728 | 9/1992 | Stark | 135/16 |

FOREIGN PATENT DOCUMENTS 1922972 11/1970 Germany ........................ 135/15.1

*Primary Examiner*—Ramon O. Ramirez
*Assistant Examiner*—Derek J. Berger
*Attorney, Agent, or Firm*—Nies, Kurz, Bergert & Tamburro

[57] ABSTRACT

An umbrella handle adapted to be temporarily attached to the side window or to the roof of a vehicle to overlie a door opening and provide protection for the user and to enable the user to have both hands free to load or unload articles into or out of the vehicle. The handle includes a mounting portion that carries one or more suction cups, either alone or together with a magnet. The mounting portion can be at the base of the handle, for temporarily securing the umbrella to a vehicle roof. Alternatively, the mounting portion can be an attachment panel that is laterally spaced from that umbrella handle, either in a fixed inclined position relative to the umbrella handle, or it can be pivotally connected with the handle to swing inwardly and outwardly. The attachment panel carries one or more suction cups, a magnet or magnetic strip, or a combination of suction cups and magnets. The suction cups permit mounting of the handle to a non-metallic surface, such as a vehicle window.

16 Claims, 6 Drawing Sheets

UMBRELLA SUPPORT

BACKGROUND OF THE INVENTION

1. Field of the Invention

This invention relates to a support for supporting an umbrella over a door opening. More particularly, the present invention relates to an umbrella support adapted to be removably attached to a vehicle surface adjacent a vehicle door, to support an umbrella over the door opening to thereby shield the user as the user is loading or unloading articles into or out of the vehicle, and to permit the user to use both hands and simultaneously be beneath the umbrella and protected from precipitation.

2. Description of the Related Art

Umbrellas typically have a handle to enable the umbrella to be conveniently carried when the umbrella is in use to protect the user from precipitation. However, when one is carrying an umbrella in one hand and another article in the other hand, such as a shopper carrying a bag of groceries, or a mother carrying a child, access to the interior of a vehicle is awkward, because both hands are occupied, and one either must set down the article or child being carried, or set down the umbrella before gaining access to the vehicle. As a result, either the article or child gets wet or the user gets wet, each of which is an undesirable result. A similar awkward condition is presented when one approaches a vehicle to remove an article from the vehicle while holding an umbrella. Those simple tasks become cumbersome to the user, and may, in fact, require the user to completely abandon the umbrella if the tasks require the use of both hands, unless the umbrella can be independently mounted on the vehicle in such a way as to continue to provide protection to the user.

The problem to which the present invention is addressed has been recognized by others, and attempts to solve the problem have been proposed. For example, in U.S. Pat. No. 4,562,849, which issued on Jan. 7, 1986, to Vladimir Sirota, a housing adapted to be mounted directly to the roof of an automobile is provided to support an umbrella over a door opening. The housing holds an umbrella and permits automatic deployment over a door opening, with subsequent automatic folding and retrieval of the umbrella. However, that approach involves a mechanically complex and expensive structure that is permanently attached to the roof of the vehicle, and it can interfere with the mounting on the roof of other forms of carriers for other items, such as rooftop carriers for luggage, or the like.

Another approach to the problem of positioning an umbrella over a vehicle door opening is disclosed in U.S. Pat. No. 5,150,728, which issued on Sep. 29, 1992, to Catherine Stark. An umbrella is provided with magnetic fasteners mounted at the outermost edges of the ribs that support the canopy. The magnetic fasteners are adapted to contact the roof, and are magnetically retained on metallic roof to thereby serve to maintain the umbrella in position over a door opening. However, with the height of normal automobile roofs, about 50 inches or so, that approach does not allow sufficient room for the average adult to move around beneath an opened umbrella, without substantially bending over, because the umbrella canopy is mounted too low. Moreover, because the canopy of the umbrella is partially overlying the roof of the vehicle, that portion of the canopy is not available to protect the user. Additionally, it appears that the door must be opened before the umbrella can be properly positioned.

A further attempt at solving the problem is disclosed in U.S. Pat. No. 5,188,331, which issued on Feb. 23, 1993, to Gurney D. Baines, and which shows an umbrella support bracket for mounting to a vehicle. As shown, the bracket, which includes a telescoping post, is mounted in a fixed location within the vehicle's trunk. However, the use of the device is limited to the trunk area only, and it does not provide protection at the doors of the vehicle. Additionally, use of the device requires that the trunk first be opened, and the mounting post then be deployed, which requires two hands and therefore is of limited suitability.

It is an object of the present invention to overcome the shortcomings of the devices briefly described above.

It is another object of the present invention to provide a simple, inexpensive support arrangement for conveniently supporting an umbrella over a vehicle door opening to protect the user, and simultaneously to permit the user to load or unload the vehicle without exposing to precipitation either himself or the articles to be loaded or unloaded.

SUMMARY OF THE INVENTION

Briefly stated, in accordance with one aspect of the present invention, an umbrella support is provided for removably fastening an umbrella to a smooth surface. The support is provided as part of an umbrella handle that includes a hand grip member for connection with an umbrella shaft that carries at an outer end a canopy supported by a plurality of radially extending, collapsible support ribs. A mounting member is carried by the hand grip member and includes an outwardly facing attachment surface for removably mounting the umbrella handle to a substantially smooth surface.

In accordance with another aspect of the present invention, the outwardly facing attachment surface can include one or more suction cups, for mounting to a smooth surface, or it can include a mounting magnet to permit attachment of the umbrella to a surface that either is or is adjacent to a magnetically permeable material, wherein the mounting member and attachment surface can either be fixed in position at a predetermined angle relative to the longitudinal axis of the umbrella shaft, or, alternatively, they can be pivotally carried by the umbrella handle.

DESCRIPTION OF THE PREFERRED EMBODIMENT

Figure 1:
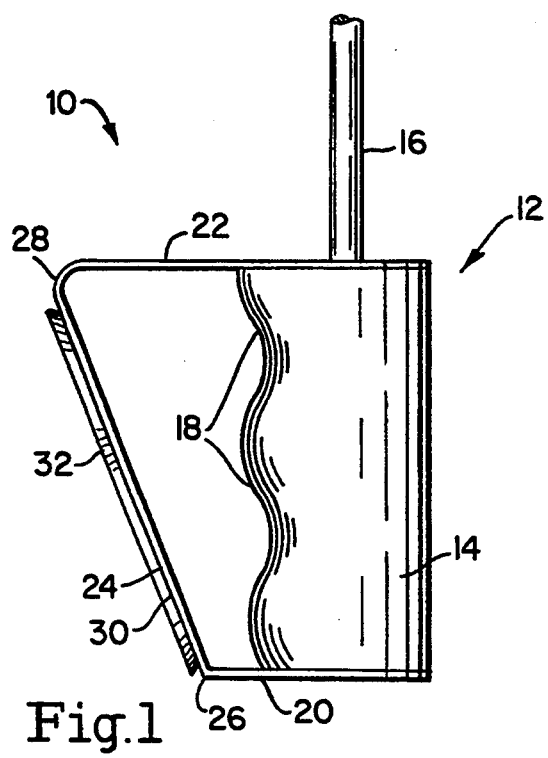
FIG. 1 is a fragmentary side elevational view of a portion of an umbrella showing the umbrella shaft and an attached umbrella handle having a structure in accordance with the present invention.

Referring now to the drawings, and particularly to FIG. 1 thereof, there is shown an umbrella 10 having a handle 12 including a hand grip portion 14 suitable for gripping by one hand of a user. Umbrella 10 includes a central shaft 16 of predetermined length and that extends from handle 12 to terminate at its upper end at a foldable canopy (not shown) of conventional design and structure, and which can be formed from a woven fabric or a flexible film to provide a water repellent surface to protect the user. The canopy can be supported by a plurality of radially extending, articulated support ribs (not shown) in the conventional manner. The canopy support ribs can either be of a fixed length, or they can be provided in the form of a pivotable link arrangement, such as is employed in various forms of collapsible umbrellas that have a structure that is known to those skilled in the art.

Hand grip member 14 is rigidly connected with central shaft 16, and it is of generally tubular form preferably with an outer surface having undulations 18 formed for convenient gripping of handle 12 by the hand of the user. Hand grid member 14 can be formed from any of a number of different materials, but is most conveniently made from an injection molded plastic, such as polypropylene, polystyrene, or the like. Additionally, hand grip member 14 has an axial length of about three or four inches.

Handle 12 shown in FIG. 1 includes a lower lateral support arm 20 that extends substantially radially outwardly, relative to the longitudinal axis of central shaft 16, from the outer end surface of hand grip member 14. A similarly oriented, upper lateral support arm 22 extends substantially radially outwardly, relative to the longitudinal axis of central shaft 16, from the upper end surface of hand grid member 14. As shown, the radial lengths of the respective lateral support arms are unequal, with the upper lateral support arm having a greater radial length.

Extending between and rigidly connected to the outermost ends of each of lower lateral support arm 20 and upper lateral support arm 22 is an attachment panel 24. Preferably, attachment panel 24 is integrally formed with each of the respective lateral support arms 20, 22. The connections between attachment panel 24, which preferably has a substantially rectangular structure, and the respective lateral support arms 20, 22 can be an angular joint 26, such as that shown at the intersection of attachment panel 24 and lower lateral support arm 20, or it can be a rounded transition section 28 having a predetermined radius, as shown in FIG. 1 at the point of connection of attachment panel 24 with upper lateral support arm 22. The radial length of the lower lateral support arm is preferably selected to provide a small space between the lowermost end of attachment panel 24 and hand grip 14 to accept the little finger of a user. Upper lateral support arm 22 has a greater radial length than that of lower arm 20, to orient attachment panel 24 at an acute angle relative to the longitudinal axis of central shaft 16. In that regard, the inclination angle between attachment panel 24 and the longitudinal axis of central shaft 16 can range from about 10° to about 45°, and preferably is within the range of about 20° to about 30°.

Positioned on the laterally outwardly facing surface 30 of attachment panel 24 is a form of attachment means to permit removable attachment of umbrella handle 12 to a surface. If the surface to which handle 12 is to be attached is a metallic surface having a relatively high degree of magnetic permeability, then the attachment means can be a strip magnet 32 of suitable magnetic field strength to securely hold umbrella 10 in a desired position on a metallic surface that is vertical or slightly inclined to the vertical. Strip magnet 32 can be a magnetically permeable metallic material having an outwardly facing surface that can be covered with a protective, thin outer coating of a suitable plastic material, such as polyethylene, or the like, to avoid scratching or otherwise marring the metallic surface, should the surface happen to be a painted surface. Alternatively, the magnet can instead be a flexible strip magnet of known construction, wherein magnetic particles are embedded within a flexible plastic matrix. Such metallic and flexible magnets are available from sources such as Magnet Sales & Mfg. Co., of Culver City, Calif.

Figure 2:
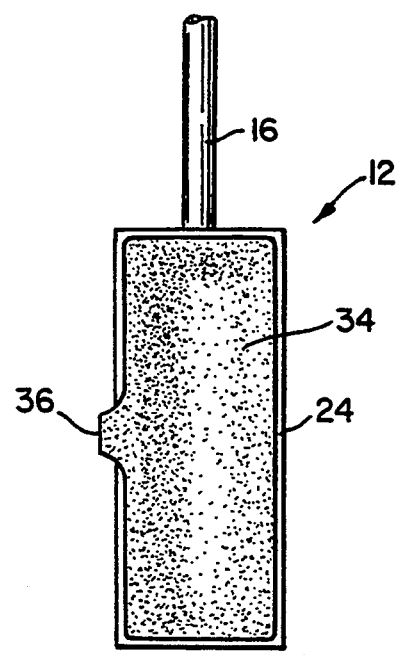
FIG. 2 is a fragmentary front elevational view, or a left side view, of the structure as illustrated in FIG. 1.
Figure 3:
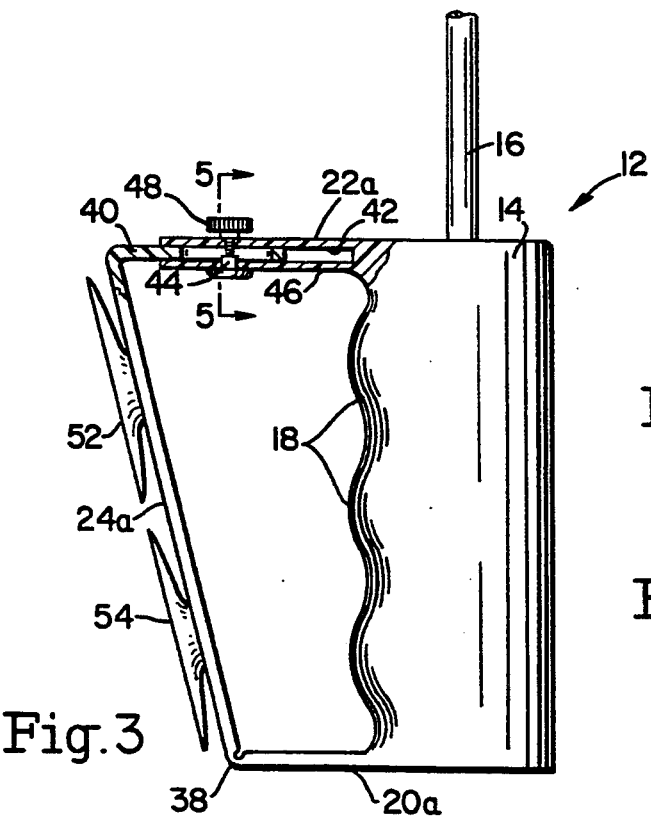
FIG. 3 is a side elevational view similar to FIG. 1, showing an alternative embodiment that permits the angle of an attachment panel relative to the umbrella shaft axis to be manually adjusted by the user.
Figure 4:
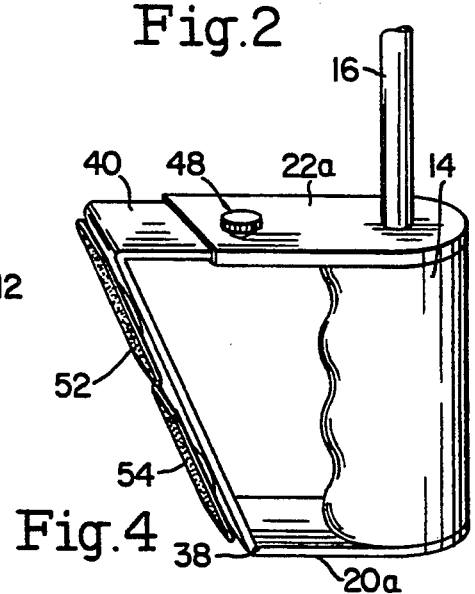
FIG. 4. is a fragmentary top perspective view of the structure shown in FIG. 3.

As an alternative attachment means to the strip magnet shown in FIG. 1, and to permit attachment of the hand grip member to a non-magnetically-permeable metallic surface, or to a glass surface, a suction cup 34 can be secured to outwardly facing surface 30 of attachment panel 24, as shown in FIG. 2. A generally rectangular suction cup is shown, one that overlies substantially the entire area of rectangular attachment panel 24. Suction cup 34 can include a release tab 36 to facilitate convenient release of the suction cup from the surface to which it is attached, which can be, for example, a glass window of an automobile, or other vehicle. Further, suction cup 34 could also be of an oval configuration, such as is shown in U.S. Pat. No. 5,078,356, which issued on Jan. 7, 1992, to William E. Adams, and which discloses a suction cup structure having an offset neck and a generally oval configuration for supporting heavier loads. The disclosure of U.S. Pat. No. 5,078,356 is hereby incorporated herein by reference, to the same extent as if fully rewritten.

Figure 5:
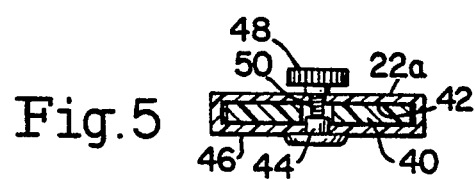
FIG. 5 is a cross-sectional view taken along the line 5—5 of FIG. 3.
Figure 6:
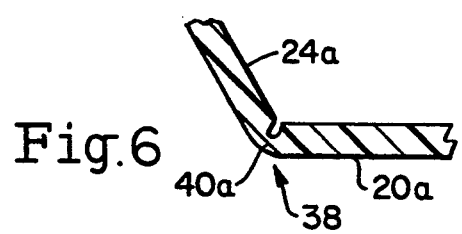
FIG. 6 is an enlarged, fragmentary cross-sectional view of the hinged connection between the attachment panel and a lower lateral extension from the hand grip portion of the umbrella handle as shown in FIG. 3.

Because the surfaces onto which handle 12 is intended to be applied can vary in their inclination from the vertical, accommodation of the various inclinations can be effected by providing a structural arrangement in which the angular inclination of the attachment panel relative to the central shaft longitudinal axis can be changed. Such a structure is shown in FIGS. 3 through 6, in which attachment panel 24a is connected with lower lateral support arm 20a at an integral hinge 38, preferably one that is molded in place, and that can have a structure of the type shown in greater detail in FIG. 6. As shown in FIG. 6, hinge 38 includes a reduced thickness portion 40, having a smaller thickness than that of either attachment panel 24a or of lower lateral support arm 20a, and it permits flexing of attachment panel 24a relative to lower support arm 20a without the need for the attachment of a separate hinge structure.

Referring once again to FIG. 3, the uppermost end of attachment panel 24a includes an angularly positioned tongue 40 that can have a rectangular cross section that is slidably received within a correspondingly sized rectangular slot formed in upper lateral support arm 22a. One form of slot 42 is shown in FIG. 5, in which a post 44 having an internal thread is retained in the lower surface 46 of upper support arm 22a, and a set screw 48 having an external thread adapted to be received within the internal thread in post 44 passes through a radially extending slot 50 formed in upper support arm 22a. Radial slot 50 permits sliding movement of tongue 40 toward and away from central shaft 16, to change the radial position of tongue 40 relative to the central shaft longitudinal axis and thereby vary the angular inclination of attachment panel 24a relative to the central shaft longitudinal axis. Further, and as shown in each of FIGS. 3 and 4, a pair of suction cups 52, 54 are provided on the outwardly facing surface of attachment panel 24a, and they can be either of a circular configuration or of a rectangular configuration, or they can be of an oval configuration as shown in U.S. Pat. No. 5,078,356 referred to hereinabove.

Figure 7:
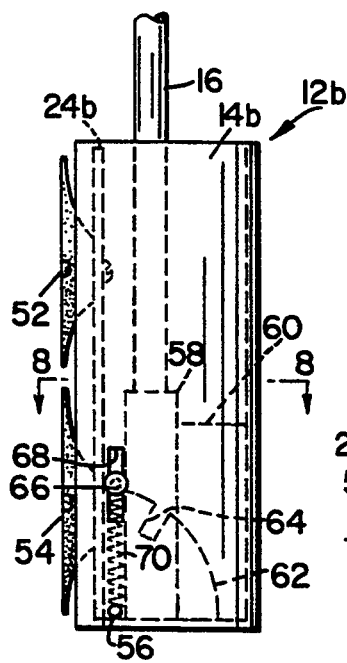
FIG. 7 is a fragmentary side elevational view of another embodiment of the present invention, showing a pivotable attachment panel in a retracted position.
Figure 8:
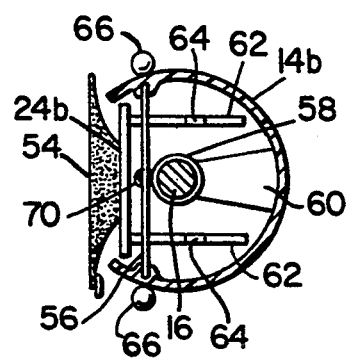
FIG. 8 is a cross-sectional view taken along the line 8—8 of FIG. 7.
Figure 9:
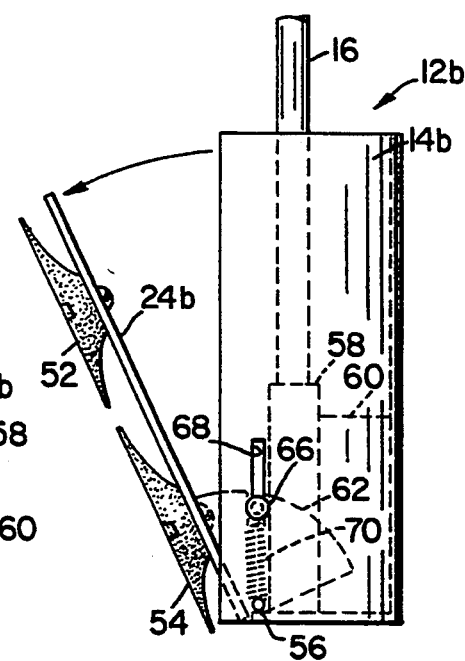
FIG. 9 is a fragmentary side elevational view similar to that of FIG. 7, showing the attachment panel in its extended position relative to the umbrella handle.

Another embodiment of the present invention is shown in FIGS. 7 through 11, in which the handle 12b includes an attachment panel 24b that includes a pair of suction cups is pivotable relative to hand grip 14b. As shown in FIG. 7, the lowermost end of attachment panel 24b is hingedly connected with the hand grip member 14b about a hinge pin 56 that extends through the lowermost end of hand grip member 14b and in a direction substantially perpendicular to the longitudinal axis of handle 12b. Central shaft 16 is securely received in a shaft retaining sleeve 58 that extends axially upwardly from the base portion of hand grip 14b. A radial support rib 60 extends from retaining sleeve 58 to the inner surface of hand grip member 14b to provide additional rigidity for central shaft 16. Attachment panel 24b includes adjacent its lowermost edge, and on an inwardly facing surface thereof, a pair of arcshaped, substantially parallel ears 62 that extend into the interior of hand grip member 14b and that are carried on hinge pin 56 to permit pivotal movement of attachment panel 24b toward and away from hand grip member 14b. Ears 62 each include an inwardly extending notch 64 that is so formed that the notches on each ear are laterally aligned with respect to each other, to define a pair of aligned slots in the ears. Notches 64 are adapted to slidably receive a generally cylindrical latch bar 66 that is slidably carried within a pair of opposed, rectangular latch slots 68 that are formed on opposed surfaces of hand grip member 14b at a position spaced axially along central shaft 16 from hinge pin 56. A tension spring 70 extends from latch bar 66 to hinge pin 56 to urge latch bar 66 in a downward direction toward hinge pin 56. Thus, when attachment panel 24b is pivoted outwardly away from hand grip member 14b and about hinge pin 56, as shown in FIG. 9, as ears 62 pivot outwardly with attachment panel 24b, notches 64 move into position next to latch bar 66, and spring 70 draws latch bar 66 into notches 64 to thereby hold attachment panel 14b at a predetermined angular relationship relative to hand grip member 14b.

Figure 10:
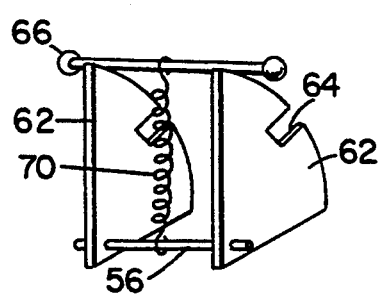
FIG. 10 is a fragmentary perspective view of the attachment panel retaining structure when the attachment panel is in its retracted position.

Preferably, latch bar 66 includes an enlarged portion at each end thereof to prevent lateral sliding movement of latch bar 66 outwardly of latch slots 68. The enlarged ends also provide a gripping surface so that latch bar 66 can be conveniently gripped and moved upwardly along latch slots 68 to disengage it from notches 64 when attachment member 14b is desired to be pivoted back into its retracted position as shown in FIG. 7. In that regard, the structural arrangement and positions of the parts are shown in greater detail in FIGS. 10 and 11. In FIG. 10, the parts are shown in their relative arrangement when attachment panel 14b is in the retracted position as shown in FIG. 7. When attachment panel 14b is in its extended position, as shown in FIG. 9, the parts are in the relative positions shown in FIG. 11.

Figure 12:
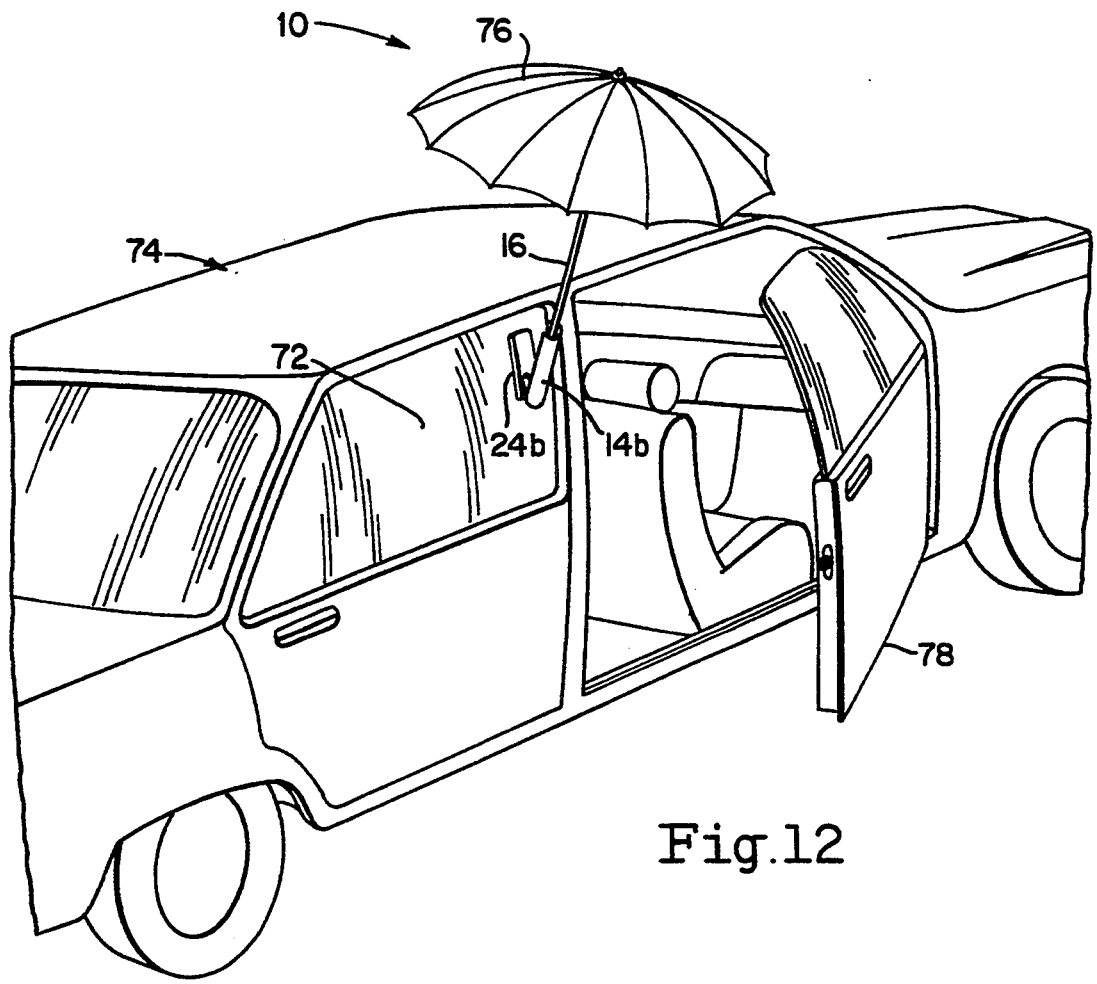
FIG. 12 is a fragmentary, right rear side perspective view of an automobile having its right front door open and having an umbrella including a handle in accordance with the present invention held in position to permit ingress and egress to and from the vehicle without holding the umbrella and while being protected from the rain.

An umbrella 10 having the handle structure in accordance with the present invention is shown in use and attached to the side rear window 72 of an automobile 74 in FIGS. 12 through 16. In operation, as the user is approaching automobile 74 and holding umbrella 10 at handle 14b with the canopy 76 extended, and assuming the umbrella handle has the structure as shown in FIGS. 7 through 9, the user presses the suction cup side of attachment panel 24b against the outer surface of window 72, which causes suction cups 52 and 54 to attach to the window surface so that attachment panel 24b is secured to window 72. Central shaft 16 is then lightly pulled outwardly until latch bar 66 engages notches 64 in ears 62, to thereby support and position umbrella 10 in the desired angular relationship relative to the opening defined by front door 78, so that umbrella 10 is securely held in the desired position over the front door opening as shown in FIG. 12. When in that position, the user can conveniently load or unload automobile 74, using both hands, and while simultaneously being protected from the rain by the positioning of umbrella 10 in its overlying relationship relative to the front door opening.

Figure 13:
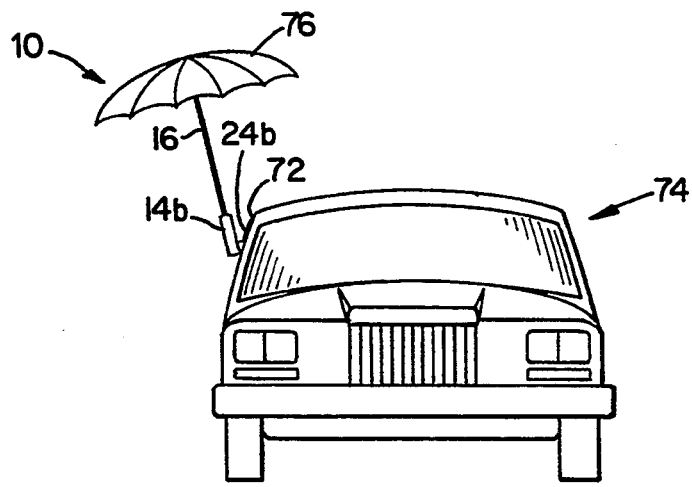
FIG. 13 is a front view of the automobile shown in FIG. 12.
Figure 14:
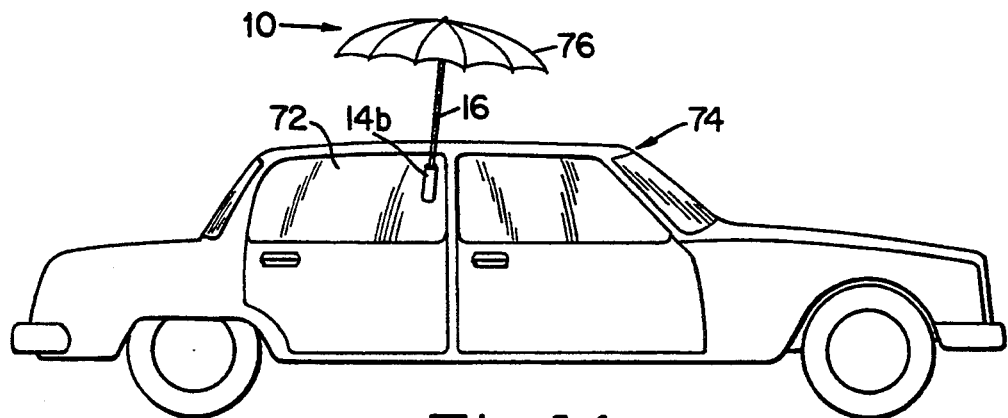
FIG. 14 is a right side view of the automobile shown in FIG. 12.
Figure 15:
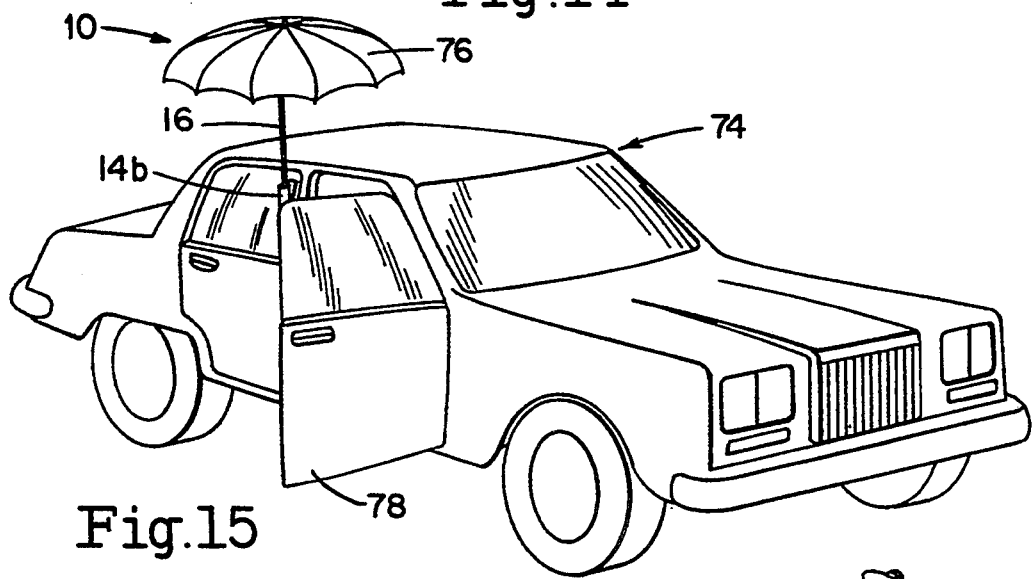
FIG. 15 is a front side perspective view of the automobile shown in FIG. 12 with the front passenger door open.

The position and preferred orientation of umbrella 10 relative to the side of automobile 74 can be more clearly seen in FIG. 13, which shows umbrella 10 in substantially overlying relationship to the door opening, while front door 78 is closed. In FIG. 14, umbrella 10 is shown tilted slightly toward the front end of automobile 74, again for better coverage over the front door opening, and FIG. 15 shows it in its operative position from the right front side.

Figure 16:
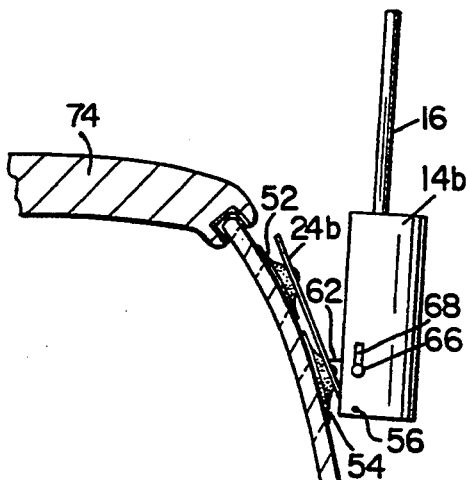
FIG. 16 is a fragmentary side sectional view showing how an umbrella having a handle in accordance with the present invention can be removably attached to an automobile window.
Figure 11:
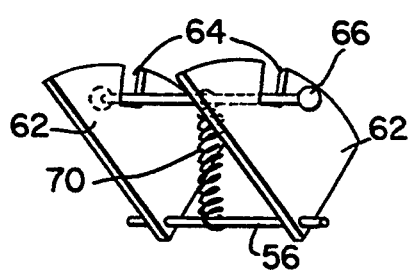
FIG. 11 is a fragmentary view similar to that of FIG. 10 showing the parts of the retaining structure when the attachment paneled is in its extended position.

An enlarged side view of the connection of hand grip member 14b and attachment panel 24b to automobile window is shown in FIG. 16. As shown, suction cups 52, 54 are attached to the outer surface of window 72, attachment panel 24b is extended outwardly relative to hand grip member 14b, and both hand grip member 14b and central shaft 16 of the umbrella are inclined outwardly relative to the automobile window surface, to overlie the door opening and thereby provide maximum protection for the user.

Figures 17, 18:
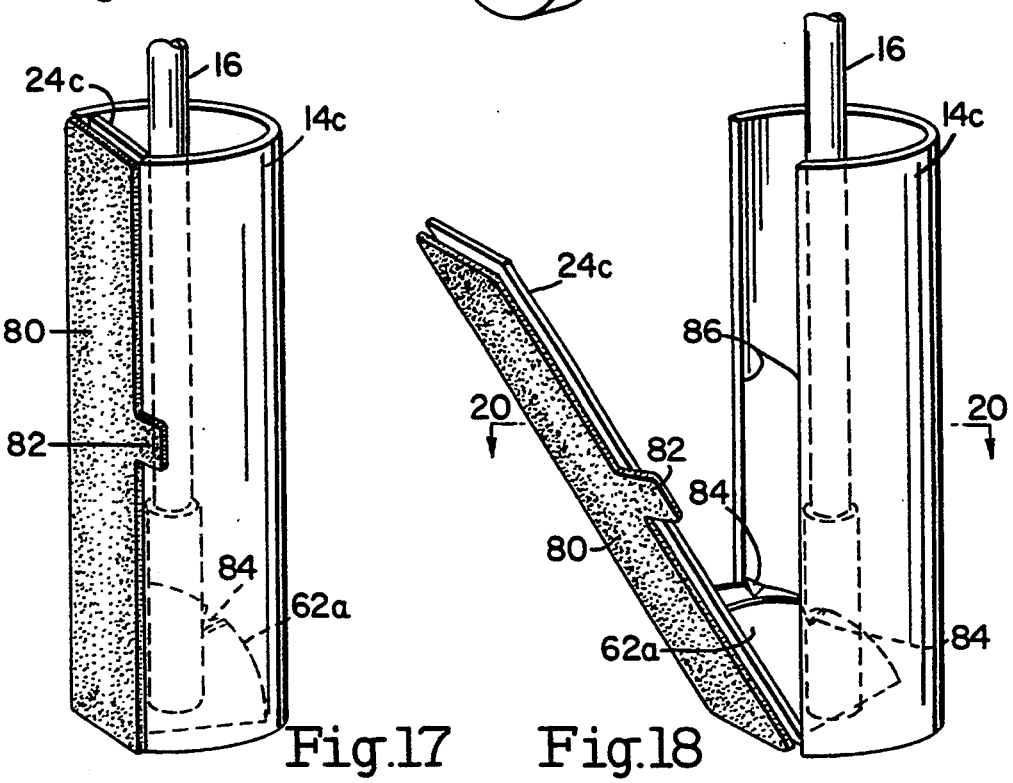
FIG. 17 is a fragmentary side perspective view showing another embodiment of an umbrella handle in accordance with the present invention with an attachment panel in the retracted position.
FIG. 18 is a view similar to FIG. 17, showing the attachment panel in its extended position.

Another embodiment of the present invention is shown in FIGS. 17 and 18. In FIG. 17 attachment panel 24c is shown in its retracted position and has a generally rectangular suction cup 80 affixed to its radially outermost surface. suction cup 80 includes a release tab 82. In FIG. 18, attachment panel 24c is shown in its extended position.

Figure 19:
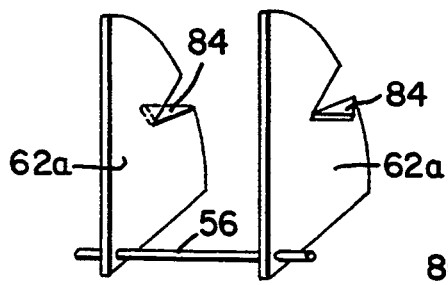
FIG. 19 is a fragmentary view showing the attachment panel movement limiting structure that forms part of the umbrella handle structure illustrated in FIGS. 17 and 18.
Figure 20:
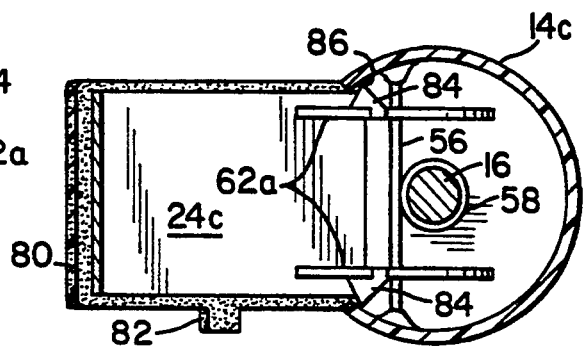
FIG. 20 is a cross-sectional view taken along the line 20—20 of FIG. 18.

The principal differences between the embodiment shown in FIGS. 17 and 18 and that shown in FIGS. 7 through 9 reside in the configuration of the stop means carried by ears 62a and 62 for limiting outward movement of attachment panel 24c or 24b relative to the associated hand grip member. As best seen in FIG. 18, ears 62a each include a laterally outwardly extending projection or tab 84 that is adapted to contact an edge 84 at the innermost surface of hand grip member 14c adjacent to attachment panel 24c, to limit outward movement of the attachment panel. The structural details and positions of the several parts can be better seen in FIGS. 19 and 20, in which tabs 84 are shown as formed from a cut and bent portion of each of ears 62a. However, if desired, ears 62a can have integrally formed, laterally outwardly extending protrusions (not shown), to provide a similar structure and the same function as are provided by tabs 84.

Figure 21:
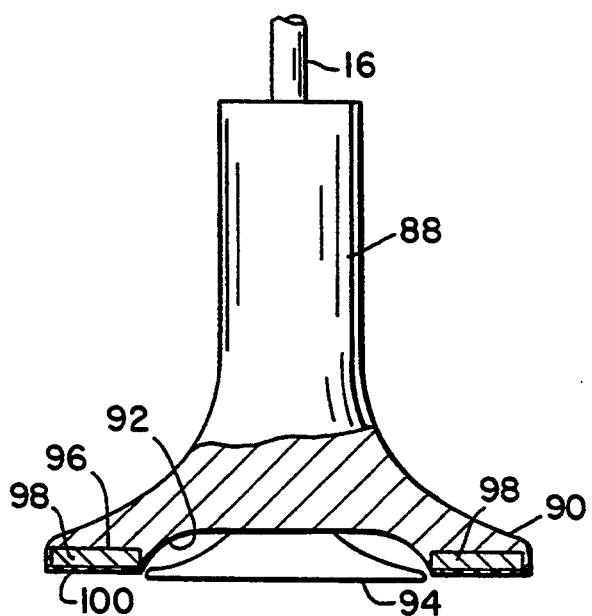
FIG. 21 is a fragmentary side elevational view, partially in section, showing a further embodiment of an umbrella handle in accordance with the present invention.
Figure 22:
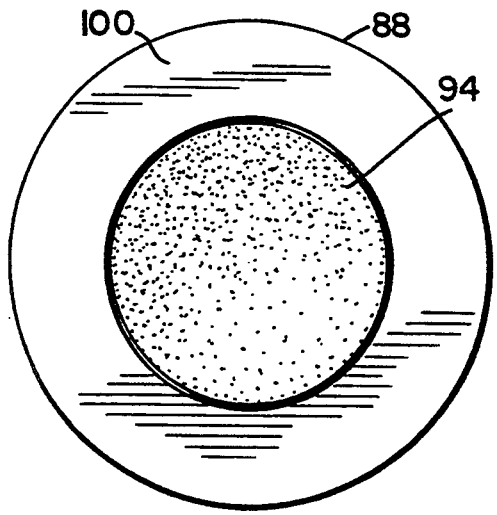
FIG. 22 is a bottom end view of the umbrella handle shown in FIG. 21.

Another structural arrangement for handle member in accordance with the present invention to permit releasable attachment of an umbrella handle to a surface is shown in FIGS. 21 and 22. As there shown, hand grip 88 is generally cylindrical in cross section and is coaxial with central shaft 16 of the umbrella. Grip 88 flares downwardly and outwardly at its lowermost end to define an enlarged end portion or knob 90. An inwardly extending recess is formed in the outermost surface of end portion 90 to receive a suction cup 92 that projects outwardly a slight distance beyond end portion 90. Recess 92 defines the inner edge of a generally annular surface 96, to which an annular magnet 98 is attached. If desired, annular magnet 98 can include a covering layer 100 of plastic material, such as polyethylene, or the like, or, alternatively, it can be formed from flexible magnet material. This embodiment is particularly useful when it is desired to temporarily attach the umbrella to the metallic roof of an automobile, adjacent a door opening. Most roofs have some degree of slope, and therefore the substantially flat bottom of this handle embodiment permits direct attachment to the roof, both by means of suction cup 94 and also by means of magnet 98, to provide a secure attachment.

Figure 23:
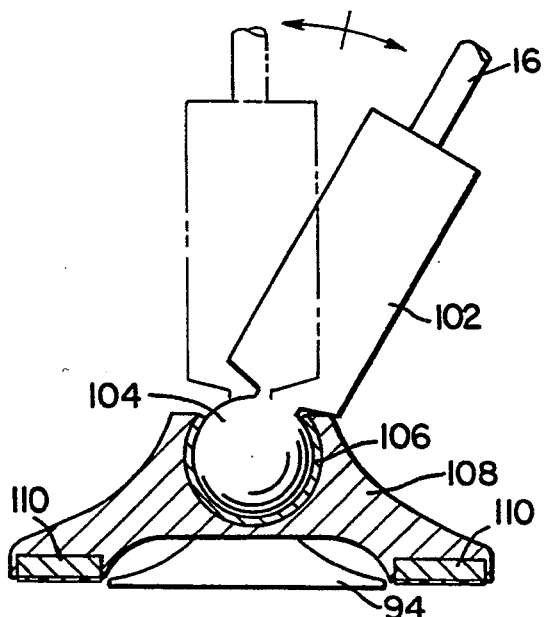
FIG. 23 is a fragmentary side elevational view, partially in section, showing a still further embodiment of an umbrella handle in accordance with the present invention.
Figure 24:
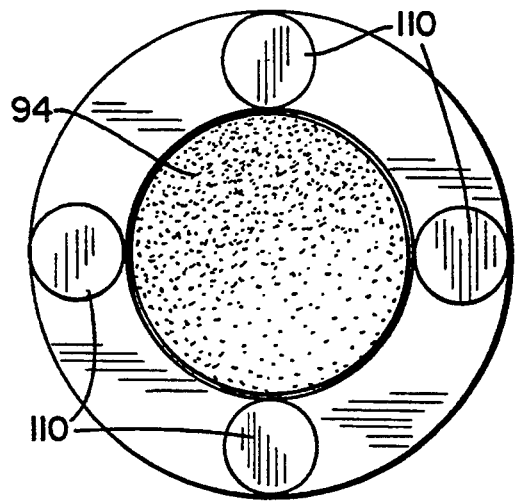
FIG. 24 is a bottom end view of the umbrella handle shown in FIG. 23.
Figure 25:
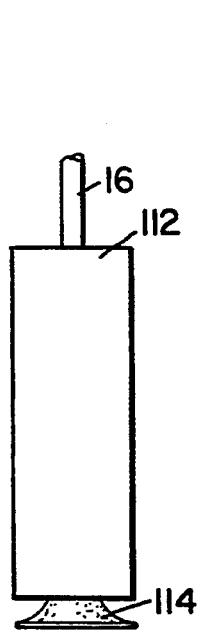
FIG. 25 is a fragmentary side elevational view of a further embodiment of an umbrella handle in accordance with the present invention.

A further variation of an umbrella handle structure in accordance with the present invention is shown in FIGS. 23 and 24. The overall structural arrangement is similar to that shown in FIGS. 21 and 22, except that the cylindrical portion of the hand grip member terminates in a ball 104 that is received in a correspondingly-formed socket 106 in the enlarged end portion 106. The ball and socket arrangement is configured in such a way that the socket tightly engages the ball so that the parts are substantially rigidly held in position at whatever desired relative position in which the parts are placed. Instead of the annular magnet 98 as employed in the embodiment of FIGS. 21 and 22, a plurality of magnets 110, which can be disk-shaped as shown, are arranged in an annular array between the centrally positioned suction cup 94 and the outer periphery of enlarged end portion 108. A further embodiment for an automobile roof-mounted umbrella support is shown in FIG. 25. The hand grip member 112 is a cylindrical structure that is securely connected with central shaft 16, and at its outermost end it carries a large suction cup 114 that is adapted to be engaged with the roof surface of an automobile.

Figure 26:
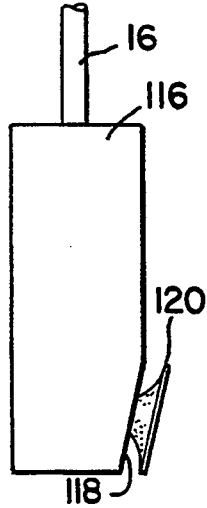
FIG. 26 is a fragmentary side elevational view of an additional embodiment of an umbrella handle in accordance with the present invention.

FIG. 26 shows another embodiment for a side-window-mounted hand grip member 116 in which the hand grip member is of cylindrical form and includes an inclined flat surface 118 adjacent the outermost end of the hand grip member. A suction cup 120 is secured to inclined surface 118, which has a predetermined angular inclination relative to the longitudinal axis of central shaft 16, to permit a relatively light weight umbrella to be conveniently attached to a vehicle window.

Figure 27:
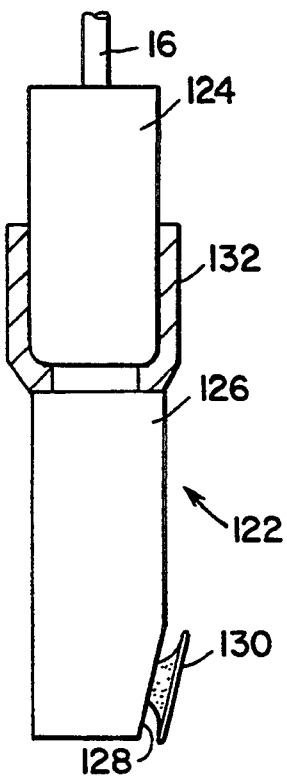
FIG. 27 is a fragmentary side elevational view, partially in section, showing an embodiment of an umbrella handle in accordance with the present invention wherein an adapter is provided that is suitable for slidable engagement with an end of an existing umbrella handle.

FIG. 27 shows a structure that operates similar to that of FIG. 26, except that it is in the form of an adaptor 122 to permit attachment to an existing, generally cylindrical umbrella handle 124. Adaptor 122 includes a base member 126 that can have a generally cylindrical form, if desired. Base member 126 is provided with an inclined outer surface 128 to which a suction cup 130 is secured.

The uppermost portion of adaptor 122 includes an enlarged tubular sleeve 132 that is adapted to be slidably fitted to handle 124 to adapt it to the umbrella supporting function performed by the present invention.

Figure 28:
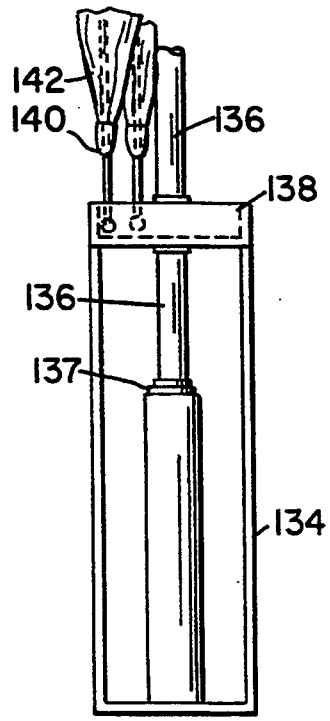
FIG. 28 is a fragmentary side elevational view, partially in section, showing an umbrella having a telescoping shaft, with the shaft and associated canopy ribs in their retracted positions.
Figure 29:
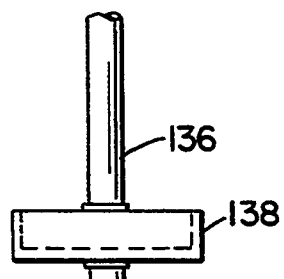
FIG. 29 is a fragmentary side elevational view of the structure shown in FIG. 28 with the telescoping shaft extended.

FIGS. 28 and 29 show an umbrella having a hand grip member 134, but without a tilting attachment panel, and in which the central shaft 136 is a telescoping tubular structure having interengaging sections 137. Shaft 136 can include a canopy-rib-retaining cup 138 to retain the ends 140 of folded canopy support ribs 142 when the umbrella is in its collapsed position.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within scope of the present invention.

What is claimed is:

1. An umbrella comprising:
   a. an umbrella shaft that has a longitudinal axis and first and second ends spaced from each other along the shaft longitudinal axis, wherein the shaft carries at the second end thereof a canopy supported by a plurality of radially extending, collapsible support ribs;
   b. a hand grip member connected with the first end of the umbrella shaft for holding and gripping the umbrella, the hand grip member including a first end engaged with the first end of the umbrella shaft and including a second end spaced from the hand grip member first end; and
   c. an outwardly facing attachment surface carried by the hand grip member for removably attaching the umbrella handle to a supporting surface, wherein the attachment surface is laterally spaced from the shaft axis and is angularly positioned relative to the shaft axis at a predetermined acute angle that has its vertex adjacent the second end of the hand grip member when the umbrella is opened and is attached to the supporting surface.

2. An umbrella in accordance with claim 1 wherein the attachment surface is fixed in position relative to the hand grip member.

3. An umbrella in accordance with claim 1 wherein the acute angle ranges from about 10° to about 45°.

4. An umbrella in accordance with claim 1 wherein the acute angle ranges from about 20° to about 30°.

5. An umbrella in accordance with claim 1 wherein the attachment surface is pivotally connected with the hand grip member to permit the angular orientation of the attachment surface relative to the shaft axis to be changed.

6. An umbrella in accordance with claim 5 wherein the attachment surface includes a hinge that is integrally formed with the hand grip member.

7. An umbrella in accordance with claim 1 wherein the attachment surface has a free end that carries a tongue that extends laterally relative to the shaft axis, and the hand grip member includes a laterally extending support arm that has a slot to slidably receive the tongue.

8. An umbrella in accordance with claim 7 wherein the support arm carries a set screw and a receiving post for threadedly receiving the set screw, and wherein the tongue can be retained in a predetermined position relative to the support arm by tightening the set screw into the receiving post.

9. An umbrella in accordance with claim 1 wherein the attachment surface carries a magnetic material for attaching the hand grip member to a magnetically permeable surface.

10. An umbrella in accordance with claim 1 wherein the attachment surface carries at least one suction cup for attaching the hand grip member to a smooth surface.

11. An umbrella in accordance with claim 1 wherein the attachment panel is pivotally connected with the hand grip member and carries an inwardly extending ear that includes a positioning notch, and the hand grip member supports an elongated latch member for sliding movement in a direction substantially parallel with the shaft axis for engagement with the notch and for positioning and retaining the attachment panel in a predetermined angular position relative to the longitudinal axis of the umbrella shaft.

12. An umbrella in accordance with claim 11 including a tension spring connected with the latch member for spring biasing the latch member into contact with the ear.

13. An umbrella in accordance with claim 1 wherein the attachment panel is pivotally connected with the hand grip member and carries an inwardly extending ear that includes a laterally outwardly extending projection for engagement with an inner surface of the hand grip member to limit pivotal outward movement of the attachment surface relative to the hand grip member.

14. An umbrella in accordance with claim 1 wherein the attachment surface includes a suction cup and defines an inclined surface formed on the outer surface of the hand grip member that is inclined at an acute angle relative to the shaft axis.

15. An umbrella in accordance with claim 1 wherein the attachment surface is removably carried by the hand grip member and includes an inclined surface defined by an acute angle relative to the shaft axis, and a suction cup carried by the inclined surface.

16. An umbrella including a foldable canopy connected with a shaft having a longitudinal axis, and a carrying handle at one end of the shaft and spaced from the canopy, said carrying handle comprising:
   a. a hand grip member mounted to the shaft for carrying the umbrella upright when the canopy is in an opened condition, the hand grip member including an outermost end spaced axially from the shaft;
   b. a mounting panel connected with the hand grip member and offset laterally from the shaft longitudinal axis, the mounting panel including a contact surface for engagement with a surface to which the mounting panel is to be attached and disposed at an acute angle relative to the umbrella shaft axis, the acute angle having its apex adjacent the outermost end of the hand grip member, wherein the mounting panel carries attachment means for removably attaching the hand grip member to a surface.

* * * * *